US012653742B2

(12) United States Patent
Daum et al.

(10) Patent No.: US 12,653,742 B2
(45) Date of Patent: Jun. 16, 2026

(54) RAIL ASSEMBLY

(71) Applicant: IMPROVEMED, LLC, Grand Rapids, MI (US)

(72) Inventors: Laurie Jill Daum, Grand Rapdis, MI (US); John D. Hall, Grand Rapids, MI (US); Robert Sebastian Mooney, De Pere, WI (US); Matthew Hartwell, Wyoming, MI (US)

(73) Assignee: ImproveMed, LLC, Grand Rapids, MI (US)

( * ) Notice: Subject to any disclaimer, the term of this patent is extended or adjusted under 35 U.S.C. 154(b) by 0 days.

(21) Appl. No.: 18/675,530

(22) Filed: May 28, 2024

(65) Prior Publication Data

US 2024/0398645 A1 Dec. 5, 2024

Related U.S. Application Data

(60) Provisional application No. 63/504,878, filed on May 30, 2023.

(51) Int. Cl.
*A61G 13/00* (2006.01)
*A61G 13/10* (2006.01)

(52) U.S. Cl.
CPC ......... *A61G 13/0018* (2013.01); *A61G 13/10* (2013.01)

(58) Field of Classification Search
CPC .... A61G 13/0018; A61G 13/06; A61G 13/08; A61G 7/0509; A61G 7/0507; A61G 7/0513; A61G 7/053; A61G 7/0516; A61G 7/015; A61G 7/0514; A61G 13/1245; A61G 7/0522; A61G 7/0524; A61G 13/10; A61G 2203/723; A61G 7/0518; A61G 7/018; A61G 7/012; A61G 13/125; A47C 21/08; A47C 21/00; A47C 31/00
USPC ..................................... 5/600, 662, 428, 430
See application file for complete search history.

(56) References Cited

U.S. PATENT DOCUMENTS

| | | | | |
|---|---|---|---|---|
| 5,475,884 | A | 12/1995 | Kirmse et al. | |
| 6,058,531 | A * | 5/2000 | Carroll | A61G 7/0513 5/430 |
| 7,039,971 | B2 * | 5/2006 | Sebastien | A61G 7/053 5/430 |
| 7,805,789 | B1 * | 10/2010 | Dean | A61G 7/053 5/646 |
| 8,578,531 | B2 * | 11/2013 | Abernathey | A61G 7/05 5/426 |
| 11,229,566 | B2 * | 1/2022 | Lam | A61G 7/053 |

OTHER PUBLICATIONS

"Table." Merriam-Webster, Merriam-Webster, www.merriam-webster.com/dictionary/table (Year: 2019).*

* cited by examiner

*Primary Examiner* — Madison Emanski
(74) *Attorney, Agent, or Firm* — McGarry Bair PC

(57) ABSTRACT

A rail assembly for a medical examination table. The medical examination table having a main body including a side surface. The rail assembly having a support frame, a connecting rail, and a mount. The support frame having a set of rails. The connecting rail extending from the support frame to a distal end. The connecting rail being couplable to the side surface.

20 Claims, 8 Drawing Sheets

RAIL ASSEMBLY

CROSS-REFERENCE TO RELATED APPLICATION

This application takes priority to U.S. Provisional Patent Application No. 63/504,878, filed May 30, 2023, which is hereby incorporated by reference in its entirety.

TECHNICAL FIELD

The present subject matter relates generally to a rail assembly, and more specifically to a rail assembly for a medical examination table.

BACKGROUND

A medical examination table is a structure including a top surface in which a patient sits on. The medical examination table is utilized in doctors' offices and hospitals for a health practitioner (e.g., doctor, nurse, technician, etc.) to perform various examinations and process. Specifically, medical examination tables can be used for imaging (e.g., X-rays, ultrasound, etc.), physicals, administration of vaccines, or any other suitable examination or process. The medical examination table includes open sides (e.g., formed without rails extending along at least a portion of the top surface) to ensure that the health practitioner can have full access to the patient during the medical examinations and processes.

A requisite for many medical examinations is that a patient needs to place themselves, assisted or unassisted, onto the medical examination table. For many patients it is difficult to get on and off medical examination tables safely due to the open sides of the medical examination table.

Many doctors' offices and hospitals have older models of medical examination tables that do not offer any support for patients to use when getting on and off the table. Demographics of the U.S. population demonstrate that in the coming years, patients will have more mobility issues. In 2019, 16% of the population was 65 years or older, and this percentage is expected to rise to 21.6% by 2040 (or 1 in 5 Americans). Individuals 85 and older are expected to be 14.4 million by 2040. Additionally, there is a corresponding loss of mobility with obesity, and rates of obesity are increasing annually in the U.S. This makes it difficult for a patient with obesity to manage getting on to an exam table. Age-related macular degeneration is the leading cause of blindness in those over 50 years. Macular degeneration has affected 11 million U.S. citizens in 2016 and is projected to affect 22 million by 2050. Compromised vision can increase the risk for falls and having a supportive device can assist with mobility in an exam room.

Accordingly, there exists a need to develop new devices and systems that address these long-known issues. Devices may need to be easily installed for retrofit applications, sturdy to increase user confidence when in use, and easily stored when not in use.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
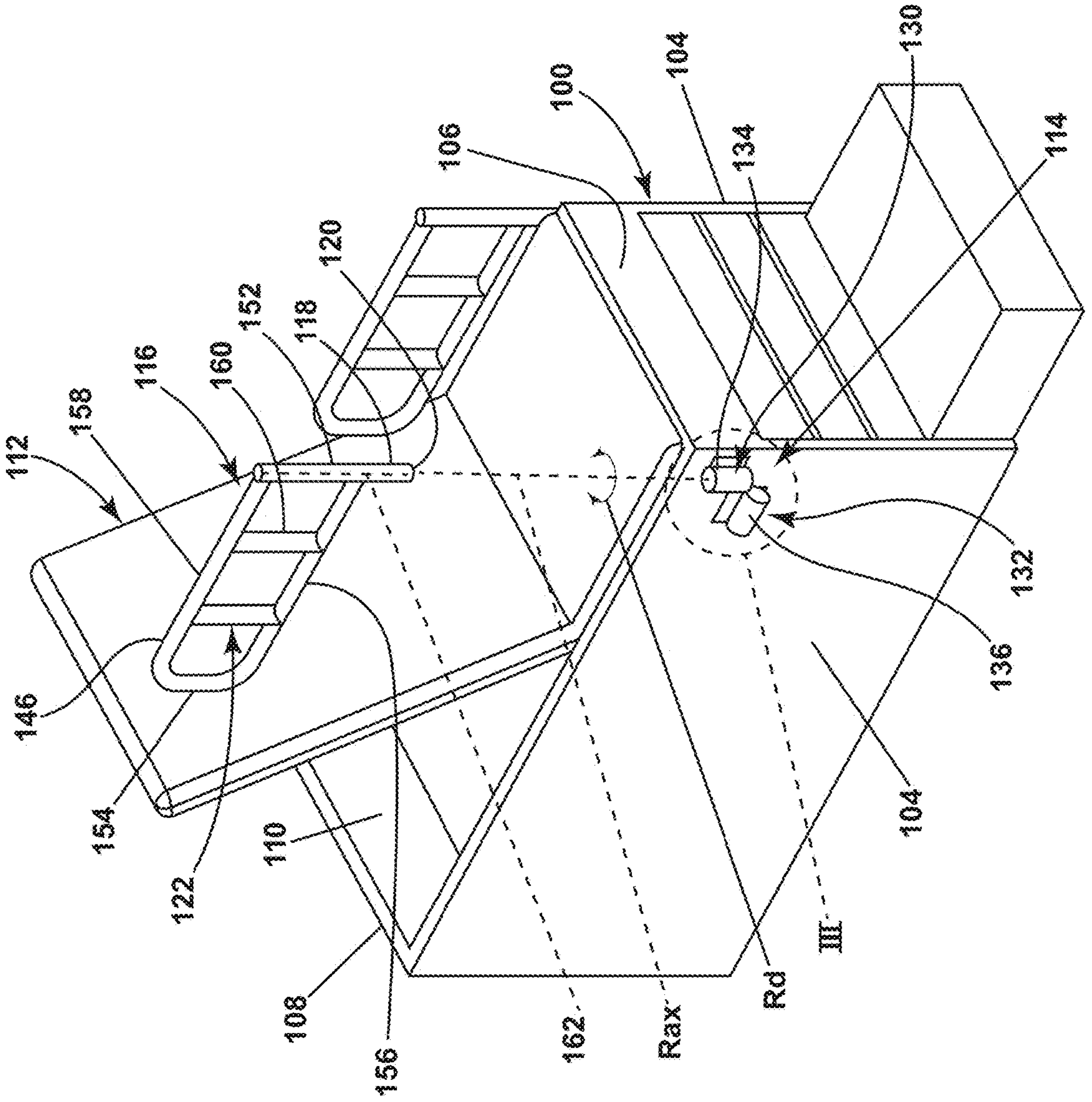
FIG. 1 is a schematic exploded view of a medical examination table including a main body and a rail assembly having a connecting arm and a support frame, the rail assembly oriented in a first position.

Aspects of the disclosure described herein are directed to a rail assembly for a medical examination table. The medical examination table includes a main body having a side surface and a top surface. The rail assembly includes a support frame and a connecting arm. The connecting rail extends from the support frame. The connecting rail is couplable to the side surface. As used herein, the term "couplable" refers to selective or removeable couplings between two or more objects. As such, it will be appreciated that the connecting rail, and hence the support frame, is removeable from the side surface. The connecting rail includes a centerline defining a rotational axis of the rail assembly. The rail assembly includes a mount used to statically secure the support frame in various positions.

The rail assembly is used to assist patients in getting onto, getting off of, or otherwise maintaining their balance while using the medical examination table that the rail assembly is coupled top. Specifically, the support frame of the medical examination table is used as a handle, crutch, or otherwise support for patients. The rail assembly can further be defined as a moveable rail assembly that allows for a health practitioner to move the rail assembly out of the way after the patient has secured themselves along the medical examination table. This movement of the rail assembly, in turn, ensures that the health practitioner has full and unobstructed access to the patient. The rail assembly is retrofit to the medical examination table. Put another way, the rail assembly can be secured to or otherwise coupled to a medical examination table that has already been manufactured and is in use at a doctor's office or hospital. As such, the rail assembly can be secured to a medical examination table that was manufactured without a rail or other device used to secure a patient.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

FIG. 1 is a schematic exploded view of a medical examination table 100. The medical examination table 100 includes a main body 102 and a rail assembly 116.

The main body 102 has opposing side surface 104, a front surface 106, a rear surface 108, and a top surface 110. The main body 102, as illustrated, is a rectangular prism. However, it will be appreciated that the main body 102 has any suitable shape.

A seat 112 is provided along the top surface 110. The seat 112 is defined as any suitable assembly, device, or component that is used to receive a patient when the patient is provided along the medical examination table 100. As a non-limiting example, the seat 112 can be a reclining/including bed, as illustrated.

The rail assembly 116 includes a set of rails forming a support frame 122 and a connecting rail 118. As used herein, a "rail" is any tubular element with a hollow or solid interior used to form the support frame 122 and the connecting rail 118. The rails of the rail assembly 116 can be, for example, a cylindrical tube, as illustrated. Alternatively, one or more rail of the rail assembly 116 can be at least one of a rectangular tube, a cylindrical tube, a triangular tube, a hexagonal tube, an I-beam, a wide-flange beam, a T-bar, an L-angle beam, a channel beam, or any combination thereof.

The set of rails of the rail assembly 116 includes any number of one or more rails. As a non-limiting example, the rail assembly 116 includes multiple rails that are coupled together through any suitable coupling method such as, but not limited to, welding, adhesion, fastening, threading, bonding, or the like. Alternatively, the rail assembly 116 can be a single, unitary body that is manufactured through any suitable process such as, but not limited to, casting, molding, 3D printing, or the like.

The set of rails of the rail assembly 116 includes any suitable material. As a non-limiting example, the set of rails can include any suitable material such as, but not limited to, metals, plastics, composites, or any combination thereof.

The support frame 122 includes a perimeter rail 146. The perimeter rail 146 defines an outer perimeter of the support frame 122. The perimeter rail 146 is defined by an assembly of rails or a single, continuous rail. The support frame 122 can include a set of interior rails 160. The set of interior rails 160 are provided within an area of the support frame 122 surrounded by the perimeter rail 146.

The support frame 122, specifically the perimeter rail 146, extends between at least two ends. As a non-limiting example, the support frame 122 includes a first end 152, a second end 154, a third end 156 and a fourth end 158. A portion of the perimeter rail 146 defining the first end 152 is connected to a portion of the perimeter rail 146 defining the second end 154 via portions of the perimeter rail 146 defining the third end 156 and the fourth end 158. While described in terms of having the first end 152, the second end 154, the third end 156, and the fourth end 158, it will be appreciated that the perimeter rail 146 includes any number of two or more ends.

The connecting rail 118 extends from the support frame 122 and to a distal end 120. The connecting rail 118 extends from any suitable portion of the support frame 122. As a non-limiting example, the connecting rail 118 extends from a portion of the perimeter rail 146 that defines the first end 152. It will be appreciated, however, that the connecting rail 118 can extend from a portion of the perimeter rail 146 defining the first end 152, the second end 154, the third end 156, or the fourth end 158. It will be appreciated that the connecting rail 118 can extend from any other suitable portion of the support frame 122 such as from the set of interior rails 160. The connecting rail 118 can be integrally formed with or coupled to the support frame 122. The connecting rail 118 includes a connecting rail centerline 162.

The rail assembly 116 includes a mount 114. The mount 114 includes any number of one or more interfaces. Each interface of the one or more interfaces is configured to accept or otherwise be selectively coupled to a respective portion of the connecting rail 118. The mount 114 includes any suitable interface. As a non-limiting example, the interface can be a hollow tube, as illustrated. Alternatively, the interface can be a rod, a channel, a track, a pivot connection, a hinge, or the like. The one or more interfaces of the mount 114 can include a first interface 130 and a second interface 132. The first interface 130 and the second interface 132 can each be formed as mounting tubes, as illustrated. As a non-limiting example, the first interface 130 can include a first mounting tube 134, while the second interface 132 can include a second mounting tube 136. Both of the first mounting tube 134 and the second mounting tube 136 can include a hollow interior sized to accommodate for or otherwise accept a respective portion of the connecting rail 118.

The mount 114 is coupled to a respective side surface of the opposing sides surface 104 of the main body 102. The mount 114 is coupled to the main body 102 through any suitable coupling method. As a non-limiting example, the mount 114 can include a first mounting platform 140 and a second mounting platform 142 that are directly coupled to a respective portion of the main body 102. As a non-limiting example, the first mounting platform 140 and the second mounting platform 142 can be at least one of adhered to, welded to or fastened onto (e.g., through bolts, screws, nails, etc.) a respective portion of the main body 102. The first interface 130 and the second interface 132 are coupled to or otherwise integrally formed with the first mounting platform 140 and the second mounting platform 142, respectively. Alternatively, at least one of the first interface 130, the second interface 132, or a combination thereof can be directly coupled to the main body 102. It will be further appreciated that the mount 114 can include a single mounting platform coupling the first interface 130, the second interface 132, or any other interface to the main body 102.

The support frame 122 is coupled to the connecting rail 118. As the connecting rail 118 is coupled to the mount 114, which is coupled to the main body 102, the support frame 122 and the connecting rail 118 are coupled to the main body 102 through the mount 114.

When the connecting rail 118 is received within one of the first interface 130, the top surface 110 extends transverse the connecting rail centerline 162. When the connecting rail 118 is received within one of the second interface 132, the front surface 106 extends transverse the connecting rail centerline 162. Put another way, a projection of the connecting rail centerline 162 from the distal end 120 forms a non-zero angle with a plane extending along the top surface 110 or the front surface 106 when the connecting rail 118 is provided within the first interface 130 or the second interface 132, respectively.

The medical examination table 100 includes any number of one or more rail assemblies 116. As a non-limiting example, the medical examination table 100 includes two rail assemblies 116 mounted to respective side surfaces of the opposing side surfaces 104. It will be appreciated, however, that the medical examination table 100 can include a single rail assembly 116 coupled to a single side surface of the opposing side surface 104.

It is contemplated that the connecting rail 118, and hence the support frame 122, can be statically mounted to the main body 102 in a single orientation or positioning. It is contemplated that the connecting rail 118, and hence the support frame 122, can be dynamically or otherwise movably mounted to the main body 102 between at least two positions. As a non-limiting example, the connecting rail 118 can be moveable between the first interface 130 and the second interface 132. The movement between interfaces of the mount 114 defines a first way that the rail assembly 116 can be moveable. As a non-limiting example, the connecting rail 118, when received within the mount 114, can further rotate about a rotational axis (Rax) in a rotational direction (Rd). Specifically, the connecting rail 118 can be rotatable about the rotational axis (Rax) corresponding to the connecting rail centerline 162 at the distal end 120. The rotational axis (Rax) coincides with the connecting rail centerline 162 of the connecting rail 118. For purposes of illustration, the rotational axis (Rax) has been shown as a projection of the connecting rail centerline 162 extending from the distal end 120 of the connecting rail 118. The movement about the rotational axis (Rax) in the rotational direction (Rd) defines a second way that the rail assembly 116 can be moveable.

During use of the medical examination table 100, the rail assembly 116 can be moveable through at least one of either the first way or the second way of movement described herein. The movement of the rail assembly 116 in either the first way, the second way, or a combination thereof allows for the support frame 122 to be positioned in a variety of positions. Exemplary positionings will be described in further detail below with respect to the description of FIGS. 4-6.

The illustrated positioning, hereinafter referred to as a first position, is especially advantageous for use when a patient is already seated along the medical examination table 100 and needs to use the rail assembly 116 as support while seated or when repositioning themselves on the medical examination table 100.

The rail assembly 116 is retrofit to the main body 102 of the medical examination table 100. As such, the rail assembly 116 is defined as a retrofittable rail assembly. Put another way, the rail assembly 116 can be coupled to a main body 102 of a medical examination table 100 that has already been in use, has already been manufactured, or is otherwise already in a hospital or doctors office. Specifically, the mount 114 is retrofittable to the main body 102. Since the connecting rail 118 and hence the support frame 122 are couplable to the mount 114, an entirety of the rail assembly 116 is retrofittable to the main body 102 of the medical examination table 100.

Figure 2:
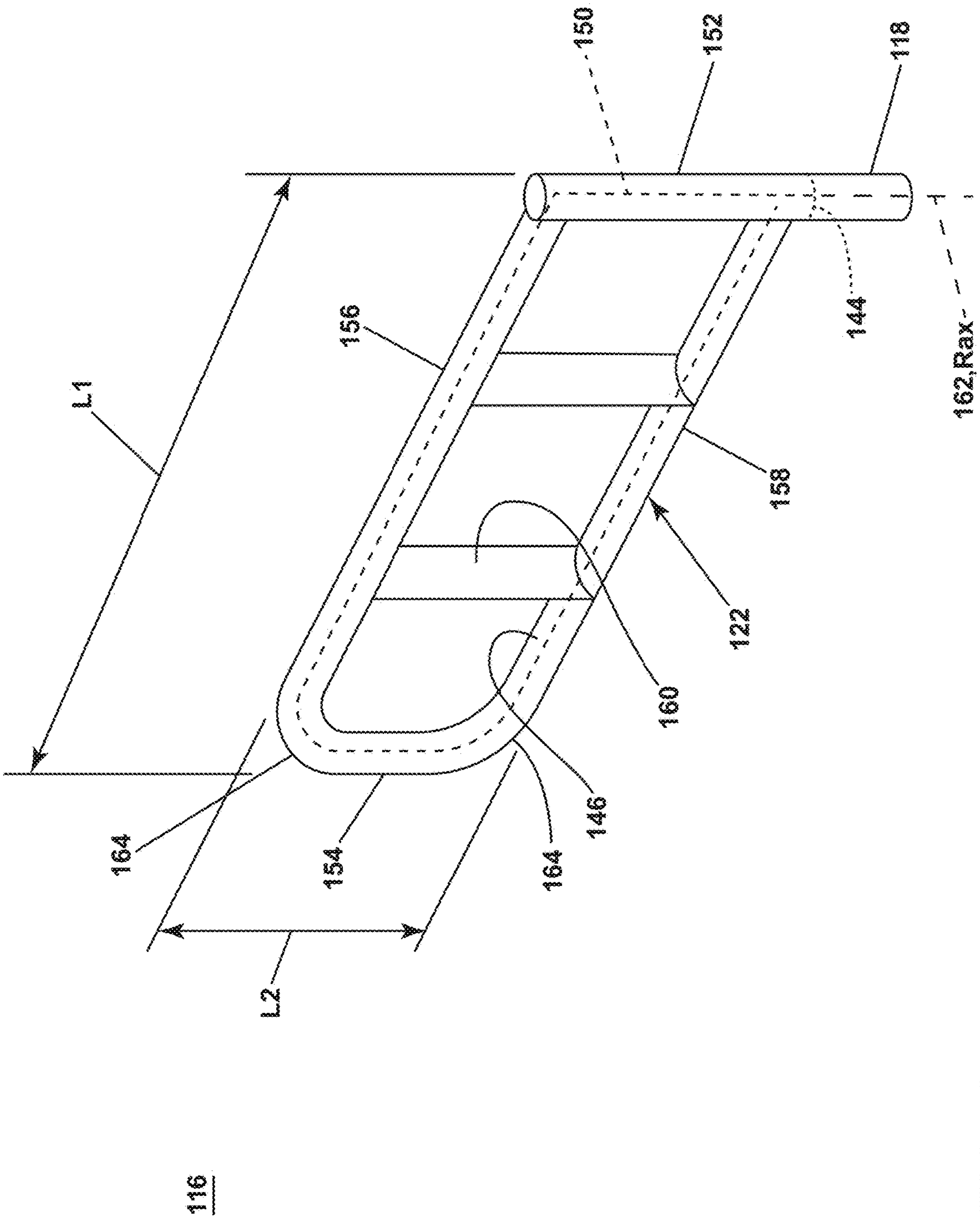
FIG. 2 is a schematic perspective view of the support frame and the connecting rail of the rail assembly of FIG. 1, further illustrating a transition between the support frame and the connecting rail.

FIG. 2 is a schematic perspective view of the support frame 122 and the connecting rail 118 of the rail assembly 116 of FIG. 1. For purposes of illustration, the support frame 122 and the connecting rail 118 have been removed from the mount 114 (FIG. 1).

The perimeter rail 146 includes a perimeter rail centerline 150. The perimeter rail centerline 150 can be in the form of any suitable shape. As a non-limiting example, the perimeter rail centerline 150 can be a rectangle with filleted corners. As illustrated, the perimeter rail centerline 150 is a rectangle with a set of filleted corners 164. The use of set of filleted corners 164 eliminates sharp or abrupt corners in a region of the rail assembly 116 where it is anticipated that a patient utilizing the rail assembly 116 would contact the rail assembly 116. This elimination of the sharp or abrupt corners of the rail assembly 116, in turn, ensures that the patient will not injure themselves when coming into contact with the rail assembly 116. The set of filleted corners 164 includes two filleted corners provided along the second end 154. It will be appreciated, however, that the set of filleted corners 164 includes any number of one or more filleted corners provided along any suitable portion of the support frame 122. It will be appreciated, however, that the perimeter rail centerline 150 can be any suitable shape such as, but not limited to, a rectangle, a circle, a triangle, a hexagon, a trapezoid, a racetrack, an ellipse, or the like.

While not illustrated, it will be appreciated that the rail assembly 116 can included any other suitable structure to aid in ensuring that the patient is comfortable while using the rail assembly 116 or otherwise does not injure themselves while using the rail assembly 116. As a non-limiting example, the perimeter rail 146 can be lined with a padding or cushion.

The perimeter rail 146 extends includes a first maximum length (L1) axially along the perimeter rail centerline 150 between the first end 152 and the second end 154. The perimeter rail 146 extends includes a second maximum length (L1) axially along the perimeter rail centerline 150 between the third end 156 and the fourth end 158. The first maximum length (L1) as illustrated is larger than the second maximum length (L2). It will be appreciate, however, that the first maximum length (L1) can be less than or equal to the second maximum length (L2).

For purposes of illustration, a transition 144 has been illustrated in phantom lines between the perimeter rail 146 and the connecting rail 118. It will be appreciated, however, that the transition 144 is for illustrative purposes only and that the connecting rail 118 can be integrally or non-integrally formed with a respective portion of the support frame 122.

The transition 144 can be provided along any suitable portion of the support frame 122. As a non-limiting example, the transition 144 can be provided along a portion of the support frame 122 such that the connecting rail 118 defines a respective portion of the first end 152. Alternatively, the transition can be axially displaced from the first end 152 with respect to the perimeter rail centerline 150. In all cases, however, it will be appreciated that the transition 144 is axially closer to the first end 152 than the second end 154, or axially equidistant between the first end 152 and the second end 154 with respect to the perimeter rail centerline 150. Put another way, the transition 144 extends from a respective portion the support frame 122 at a location that is less than or equal 50% of the first maximum length (L1) with 0% being the first end 152. The transition 144 can be provided along any suitable portion of the support frame 122 with respect to the second maximum length (L2).

Figure 3:
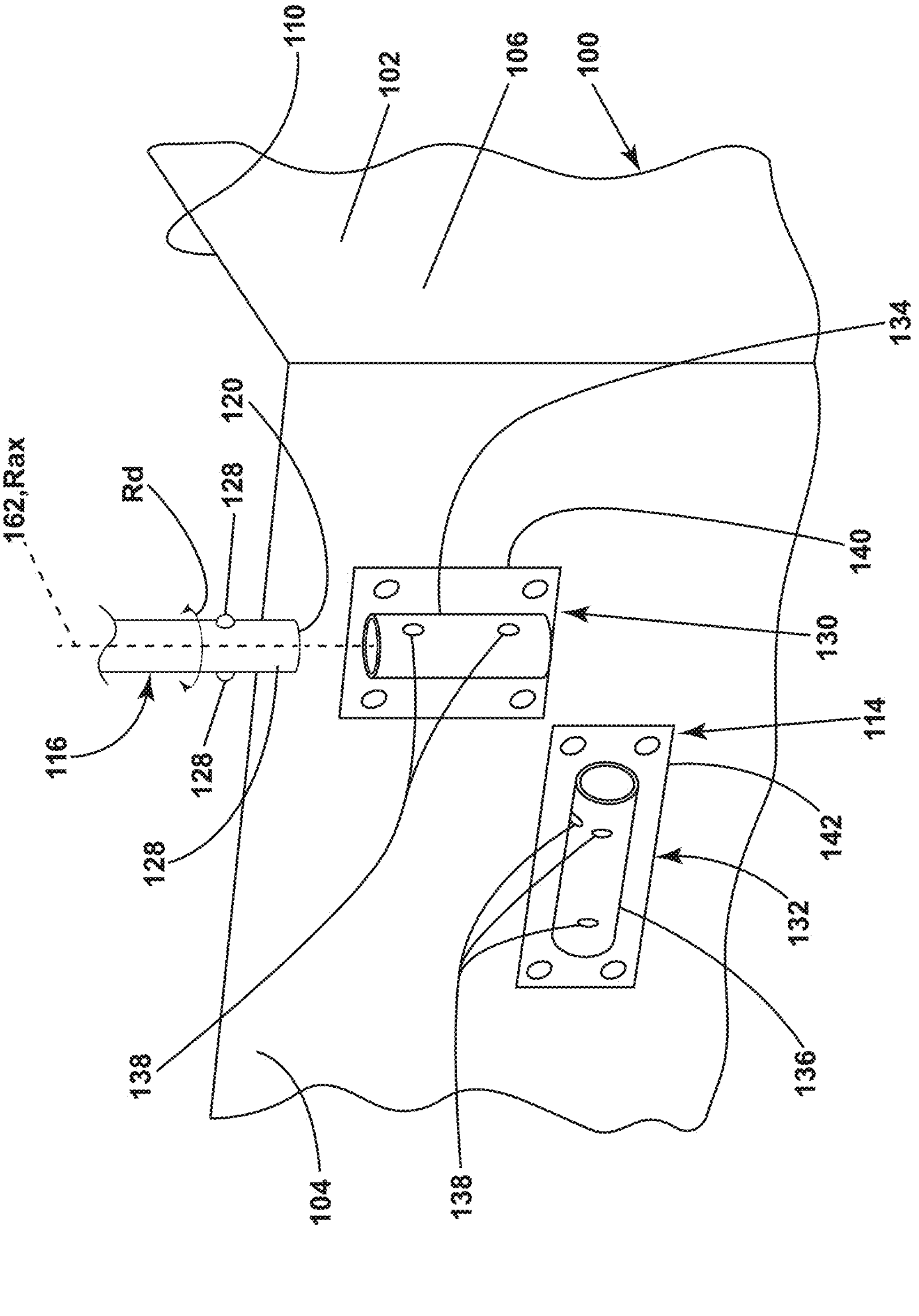
FIG. 3 is an enlarged schematic exploded view of the medical examination table as seen from area III of FIG. 1, further illustrating a first mount and a second mount of the rail assembly, the first mount and the second mount coupling the connecting rail to respective portions of the main body.

FIG. 3 is an enlarged schematic exploded view of the medical examination table 100 as seen from area III of FIG. 1. The connecting rail 118 is securable to the mount 114 through use of a set of locks 128 and a set of lock receivers 138.

When the set of locks 128 are received within the at least one lock receiver of the set of lock receivers 138, the connecting rail 118, and hence the support frame 122 (FIG. 2), is statically mounted to the mount 114. The set of locks 128 can be formed as any suitable device, assembly, or component that is adapted to be received within the set of lock receivers 138. As a non-limiting example, the set of locks 128 can be a pushpin, while the set of lock receivers 138 can be a through-hole. When formed as a push pin, to engage the set of locks 128 within the set of lock receivers 138, the set of locks 128 are compressed inwardly by a force (e.g., a user's hand) and positioned to correspond to at least one lock receiver of the set of lock receivers 138. When the force is removed, the set of locks 128 push outward and if aligned with at least one lock receiver of the set of lock receivers 138 extend into the at least one lock receiver to effectively secure the connecting rail 118 to the mount 114. The opposite method is used to decouple or otherwise disengage the set of locks 128 from the at least one lock receiver for the set of lock receivers 138. Other non-liming examples of a lock between the connecting rail 118 and the mount include, but are not limited to, a key and socket.

The set of locks 128 are provided on one of either the connecting rail 118 or the mount 114, while the set of lock receivers are provided on the other of the connecting rail 118 or the mount 114. As a non-limiting example, the set of locks 128 are provided along the connecting rail, while the set of lock receivers 138 are provided along the mount 114, specifically along the first interface 130 and the second interface 132.

The set of locks 128 can include any number of one or more locks circumferentially or axially spaced along the connecting rail 118 with respect to the connecting rail centerline 162. As a non-limiting example, the set of locks 128 can include two or more locks circumferentially spaced about the connecting rail centerline 162 and provided at a same axial length from the distal end 120, with respect to the connecting rail centerline 162.

The set of lock receivers 138 can include any number of one or more lock receivers circumferentially or axially spaced along the first interface 130 and the second interface 132 with respect to the rail centerline 162 when the connecting rail 118 is received within the respective first interface 130 and respective second interface 132. Put another way, the set of lock receivers 138 of the first interface 130 are at least one of circumferentially spaced, axially spaced, or a combination thereof with respect to the connecting rail centerline 162 as the connecting rail 118 is illustrated as being aligned with the first interface 130. The set of lock receivers 138 of the second interface 132 are at least one of circumferentially spaced, axially spaced, or a combination thereof with respect to the connecting rail centerline 162 as the connecting rail 118 only when the connecting rail 118 is aligned with the second interface 132. The set of lock receivers 138 includes any number of one or more lock receivers 138 per interface of the mount 114 that are circumferentially spaced, axially spaced, or a combination thereof.

It is contemplated that the use of the circumferential spacing, axial spacing, or a combination thereof of the set of locks 128, the set of lock receivers 138, or a combination thereof are used to secure the connecting rail 118, and hence the support frame 122, in various positions. One such position is illustrated and described in FIG. 1. The position illustrated in FIG. 1 is achieved by selectively receiving at least one lock of the set of locks 128 within at least one lock receiver of the set of lock receivers 138. It will be appreciated that various combinations of locks of the set of locks 128 received within lock receivers of the set of lock receivers 138 statically secures the rail assembly 116 in other positions, some of which will be described in greater detail below. It is contemplated that the rail assembly 116 can be moveable between two or more predefined positions. Each combination of locks of the set of locks 128 and lock receivers of the set of lock receivers 138 corresponds to one position of the predefined positions.

Figure 4:
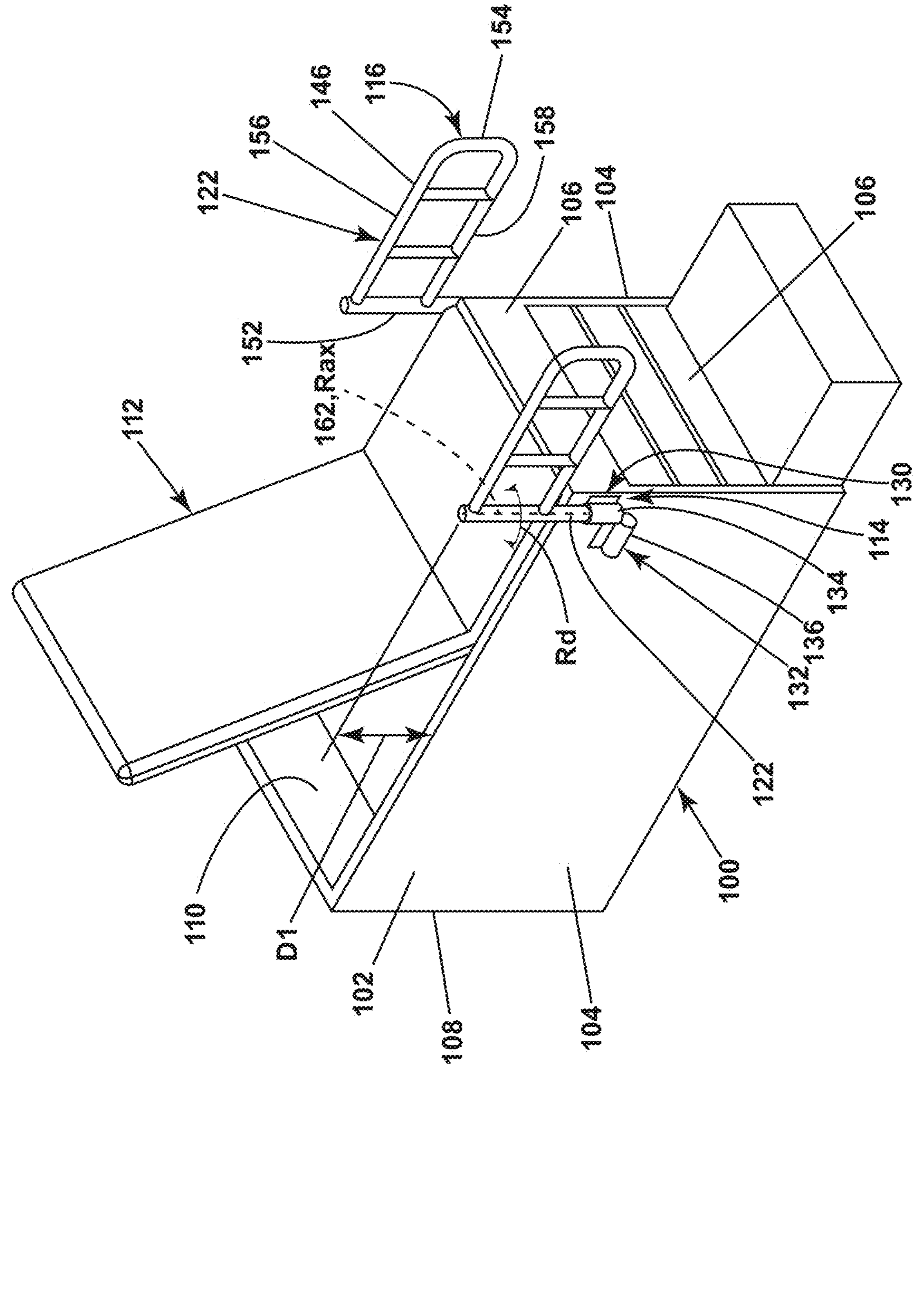
FIG. 4 is a schematic perspective view of the medical examination table of FIG. 1, further illustrating the connecting rail received within the first mount and oriented in a second position.

FIG. 4 is a schematic perspective view of the medical examination table 100 of FIG. 1. The rail assembly 116, as illustrated, is provided in a second position. The second position and the first position (FIG. 1) are each defined as positionings where the connecting rail 118 is received within the first interface 130. The first position, however, is 180 degrees from the second position with respect to the rotational axis (Rax).

It will be appreciated that the rail assembly 116 can be moveable between the first position and the second position when being received within the first interface 130. As the first position is circumferentially offset from the second position, it will be appreciated that the first interface 130 includes two or more lock receivers of the set of lock receivers 138 (FIG. 3) that statically mount or otherwise secure the rail assembly 116 in the first position and the second position, respectively. It will be appreciated that the rail assembly 116 can be secured in any suitable position that is provided circumferentially between the first position and the second position. As a non-limiting example, the rail assembly 116 can be secured within any suitable position that is within 360 degrees of the first position.

The support frame 122 can further be varied in height, designated as a first distance (D1), from the top surface 110. The first distance (D1) is a measure of the axial distance, with respect to the connecting rail centerline 162, between the third end 156 and the top surface 110. The first distance (D1) is greater than zero, with zero being the third end 156 coinciding with the top surface 110. The variation of the support frame 122 with respect to the top surface 110 (e.g., the variation of the first distance (D1)) is made possible by providing lock receiver of the set of lock receivers 138 at varying axial locations, with respect to the connecting rail centerline 162, along the first interface 130. The variation of the first distance (D1) allows for the variation of the rail assembly 116 in varying axial positions with respect to the connecting rail centerline 162 or otherwise with respect to the rotational axis (Rax).

The second position, as illustrated, is especially advantageous for use when the patient is getting onto or stepping off of the medical examination table 100. Specifically, the patient may get onto the medical examination table 100 by approaching the front surface 106. In the second position, the rail assembly 116 is oriented such that it projects outwardly from the front surface 106. This, in turn, allows for the patient to leverage themselves on the rail assembly 116 and push themselves upward and onto the top surface 110. When getting off the medical examination table 100, the illustrated second position can allow for the patient to again leverage themselves and maintain a controlled descent from the top surface 110.

While illustrated as extending through a portion of the first interface 130 axially nearest the top surface 110, it is contemplated that the connecting rail 118 can be inserted into the first interface 130 at an end of the first interface 130 that is opposite the portion of the first interface 130 axially nearest the top surface 110. By inserting the connecting rail 118 into this portion of the first interface 130, the rail assembly 116 can be received in additional, non-illustrated positions. As a non-limiting example, the connecting rail 118 can be inserted into the bottom end (e.g., opposite the side nearest the top surface 110) of the first interface 130 and be positioned in an orientation similar to the first position (180 degrees from the illustrated second position). In this position, the support frame 122 is not easily accessible to the patient. As such, this positioning can be defined as a stored position. In the stored position, the rail assembly 116 does not impede access to the top surface 110. The rail assembly 116 can be provided within the stored position during, for example, cleaning of the top surface 110 or otherwise during examination of the patient when they are provided along the top surface 110. An alternative stored position is described in greater detail with respect to FIG. 6.

Figure 5:
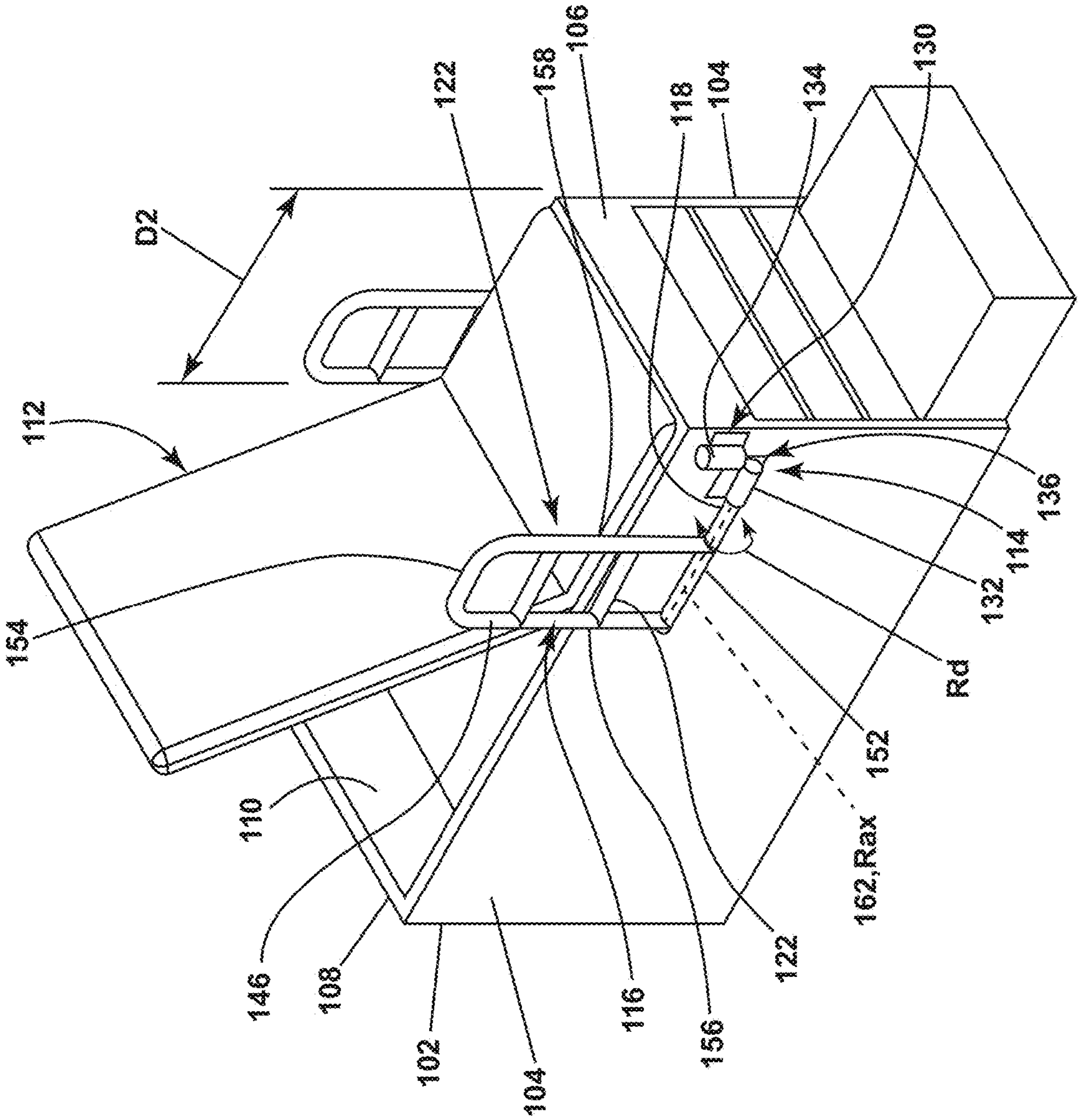
FIG. 5 is a schematic perspective view of the medical examination table of FIG. 1, further illustrating the connecting rail received within the second mount and oriented in a third position.

FIG. 5 is a schematic perspective view of the medical examination table 100 of FIG. 1. The connecting rail 118 is received within the second interface 132 and statically mounted in a third position. The first interface 130 is oriented with respect to the second interface 132 such that the connecting rail centerline 162 of the connecting rail 118 when received within the first interface 130 (e.g., FIGS. 1-4) is non-parallel to the connecting rail centerline 162 of the connecting rail 118 when received within the second interface 132, as illustrated. As a non-limiting example, the connecting rail centerline 162 when the connecting rail 118 is received within the first interface 130 is perpendicular to the connecting rail centerline 162 when the connecting rail 118 is received within the second interface 132.

The support frame 122 can further be varied in an axial distance, designated as a second distance (D2), from the front surface 106. The second distance (D2) is a measure of the axial distance, with respect to the connecting rail centerline 162, between the third end 156 and the front surface 106 when the connecting rail 118 is received within the second interface 132. The second distance (D2) is greater than zero. The variation of the second distance (D2) is made possible by providing lock receiver of the set of lock receivers 138 at varying axial locations, with respect to the connecting rail centerline 162, along the second interface 132. The variation of the second distance (D2) allows for the variation of the rail assembly 116 in varying axial positions with respect to the connecting rail centerline 162 or otherwise with respect to the rotational axis (Rax).

The third position is especially advantageous for use when the patient is laying down on the top surface 110 or otherwise along the top surface 110 and needs to move themselves towards the front surface 106. Specifically, the orientation of the support frame 122 in the third position allows for a patient to pull themselves along the top surface 110 away from or towards the front surface 106. While described as being used when the patient is on the top surface 110 or otherwise getting onto the top surface 110, it will be appreciated that the rail assembly 116 can be used in any suitable scenario during an exam. As a non-limiting example, the rail assembly 116 can be used to provide balance for the patient standing next to the medical examination table 100 during examinations that require the patient to stand.

While illustrated as extending through a portion of the first interface 130 axially nearest the rear surface 108, it is contemplated that the connecting rail 118 can be inserted into the second interface 132 at an end of the second interface 132 axially opposite the portion of the second interface 132 axially nearest the rear surface 108. By inserting the connecting rail 118 into this portion of the second interface 132, the rail assembly 116 can be received in additional, non-illustrated positions.

Figure 6:
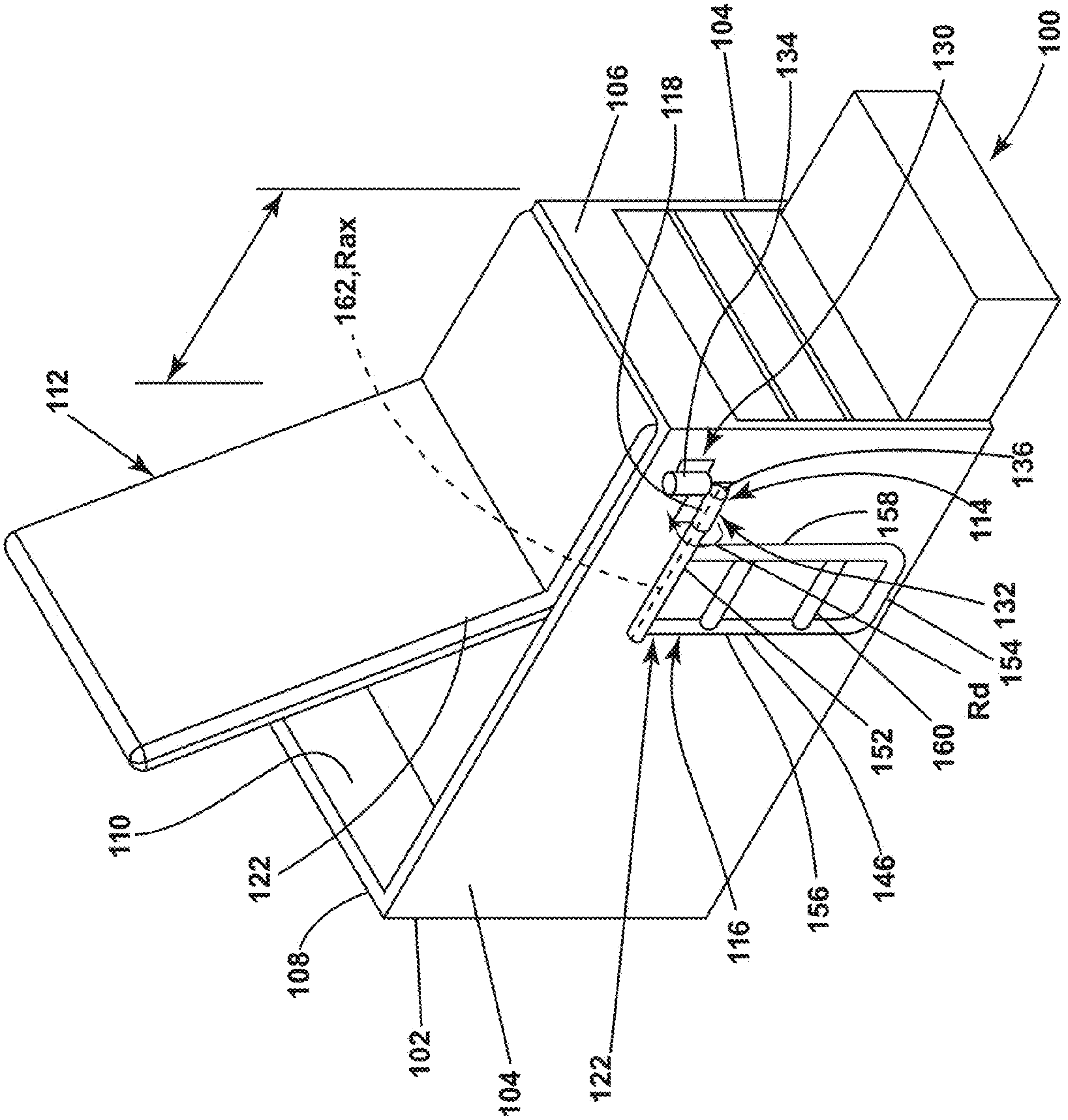
FIG. 6 is a schematic perspective view of the medical examination table of FIG. 1, further illustrating the connecting rail received within the second mount and oriented in a fourth position defining a stored position.

FIG. 6 is a schematic perspective view of the medical examination table 100 of FIG. 1. The rail assembly 116 is provided within a fourth position that is 180 degrees from the third position (FIG. 5). The rail assembly 116 can include the set of locks 128 (FIG. 3) and the set of lock receivers 138 (FIG. 3) to statically mount the rail assembly 116 in the fourth position, the third position or any position therebetween.

The fourth position is especially advantageous for use as a stored position. As discussed herein, the stored position is used to ensure that the rail assembly 116 is out of the way during examination of the patient, cleaning of the top surface 110, or otherwise when the medical examination table 100 is not in use.

With reference to FIGS. 1 and 4-6, the variation between the first position, the second position, the third position, the fourth position, and any other position can be determined by the need of the patient, the health practitioner, or other personnel that will come into contact with the medical examination table 100. Other personnel, for example, can include a janitor or nurse who may need to position the rail assembly 116 in a stored position during cleaning of the medical examination table 100. It will be appreciated that the positioning of the rail assembly 116 can be varied during an examination. As a non-limiting example, a health practitioner may position the rail assembly in the second position at the beginning of the examination to help the patient onto the top surface 110, in the first position during the examination to provide the patient with some stability while on the top surface 110, and in at least one of the second position or the third position at the end of the examination to help the patient get off of the top surface 110.

As discussed herein, the medical examination table 100 can include a plurality of rail assemblies. It will be appreciated that each rail assembly 116 of the plurality of rail assemblies can be provided in the same or different position at a given time. As a non-limiting example, one rail assembly 116 can be provided within a stored position (e.g., the fourth position) while another rail assembly can be provided within a non-stored position (e.g., the first position, the second position, the third position, etc.) at the same time.

Figure 7:
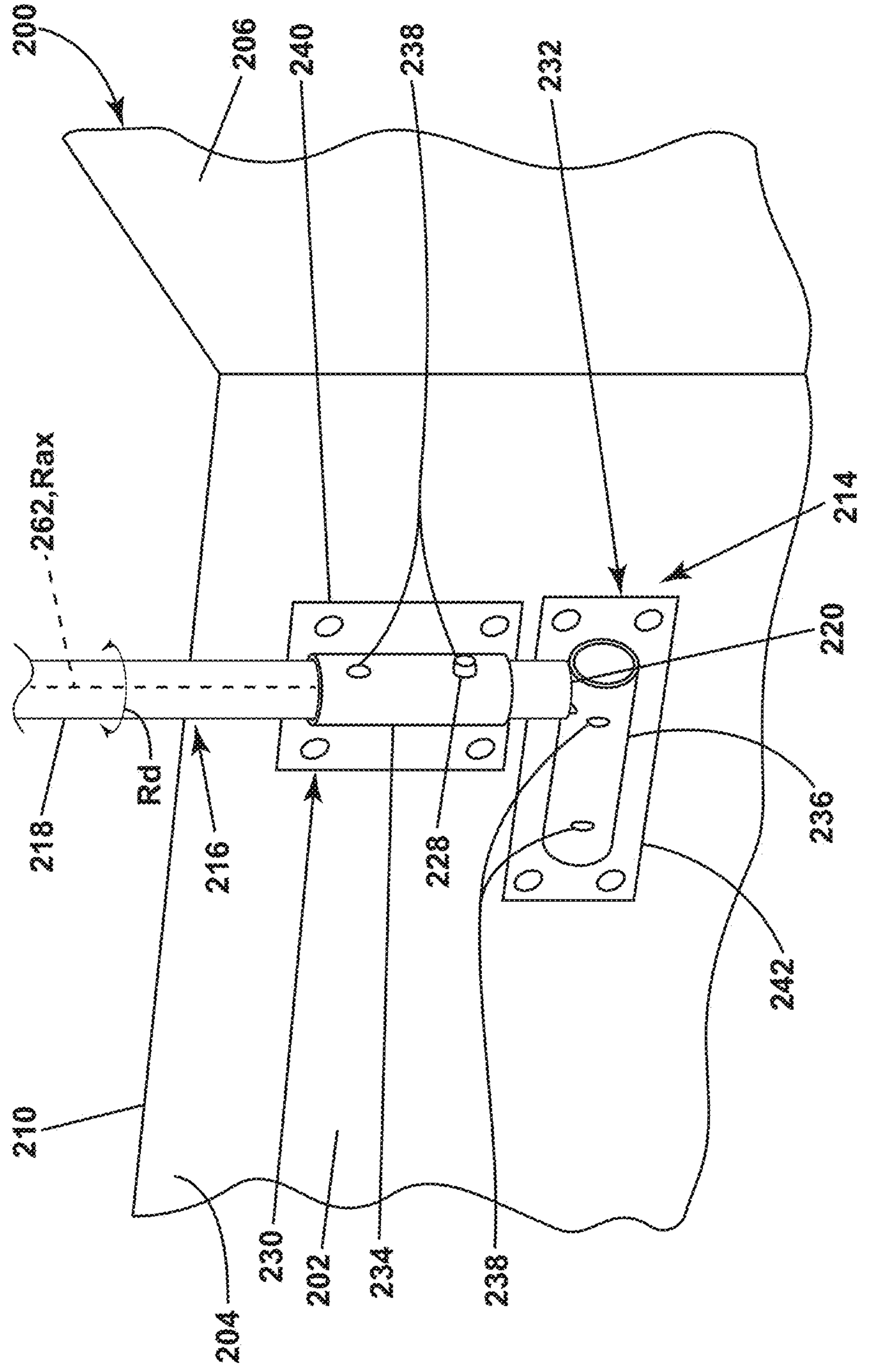
FIG. 7 is a schematic perspective view of an exemplary rail assembly suitable for use as the rail assembly of FIG. 1, further illustrating a first mount, a second mount, and a connecting arm having a distal end, the distal end resting against a respective portion of the second mount.

FIG. 7 is a schematic perspective view of an exemplary rail assembly 216 suitable for use as the rail assembly 116 of FIG. 1. The rail assembly 216 is similar to the rail assembly 116; therefore, like parts will be identified with like numerals increased to the 200 series with it being understood that the description of the rail assembly 116 applies to the rail assembly 216 unless noted otherwise.

The rail assembly 216 includes a support frame (e.g., the support frame 122 of FIG. 1), a connecting rail 218, and a mount 214. The connecting rail 218 terminates at a distal end 220 and includes a connecting rail centerline 262. The connecting rail 218 can be rotatable in a rotational direction (Rd) about the connecting rail centerline 262 to define a rotational axis (Rax). The mount 214 includes an interface. As a non-limiting example, the mount 214 includes a first interface 230 and a second interface 232. The first interface 230 and the second interface 232 include any suitable interface such as, but not limited to, a first mounting 234 and a second mounting tube 236, respectively. The first interface 230 and the second interface 232 can be formed as any suitable interface such as, but not limited to, a hollow tube. The mount 214 can include a mounting platform; specifically, the mount 214 can include a first mounting platform 240 and a second mounting platform 242. The connecting rail 218 is receivable within the mount 214. The rail assembly 216 includes a set of locks 228 and a set of lock receivers 238. As illustrated, a lock of the set of locks 228 is received within a respective lock receiver of the set of lock receivers 238.

The rail assembly 216 is couplable (e.g., retrofittable) to a medical examination table 200. The medical examination table 200 includes a main body 202 with at least a side surface 204, a front surface 206, and a top surface 210. The rail assembly 216 is couplable to the side surface 204 of the main body 202.

The rail assembly 216 is similar to the rail assembly 116 in that the connecting rail 218 is receivable within the mount 214. However, the mount is oriented such that when the connecting rail 218 is received within the first interface 230, the distal end 220 can extend through the first interface 230 and contact a respective portion of the second interface 236.

Figure 8:
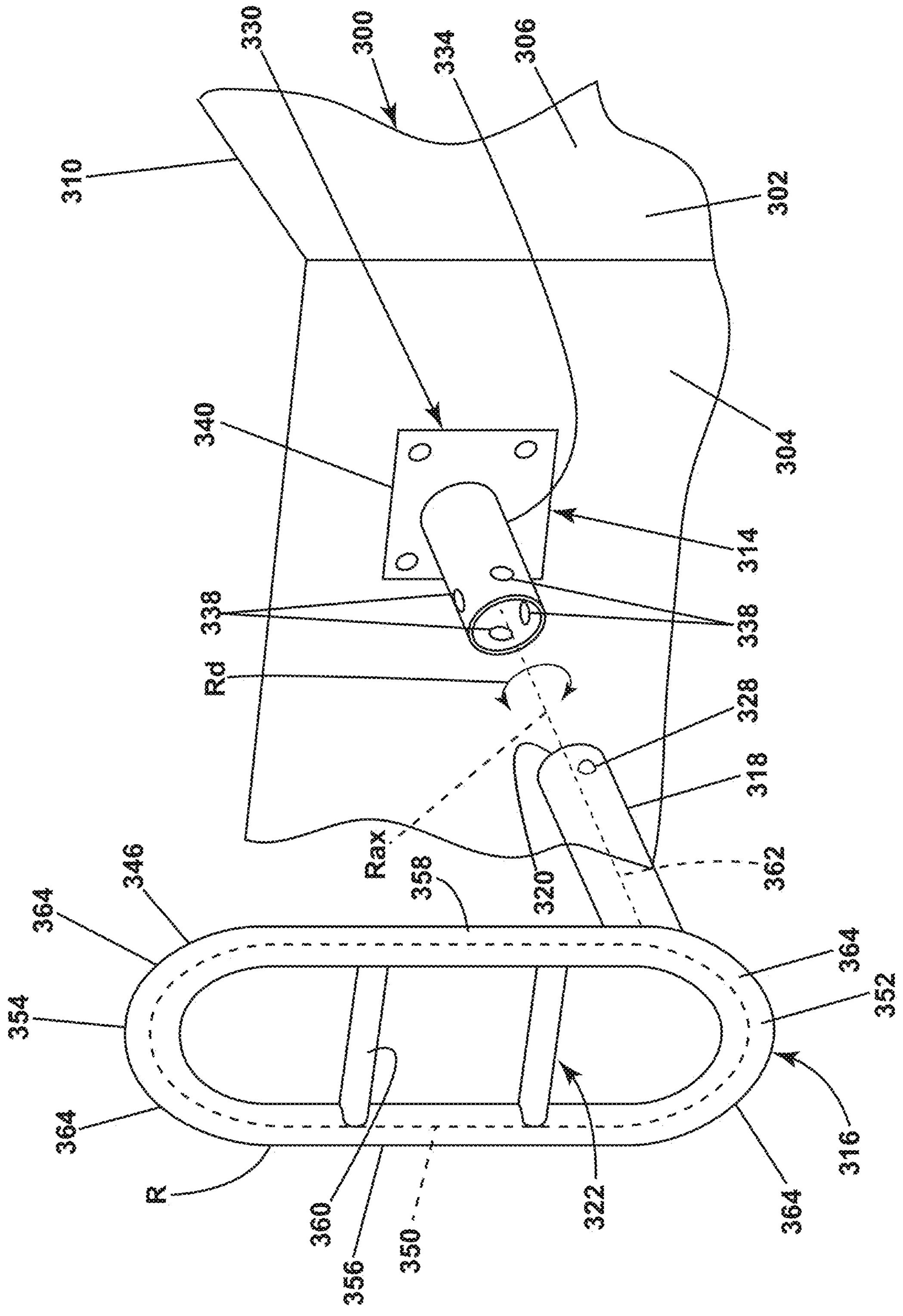
FIG. 8 is a schematic perspective view of an exemplary rail assembly suitable for use as the rail assembly of FIG. 1, further illustrating a singular mount.

FIG. 8 is a schematic exploded, perspective view of an exemplary rail assembly 316 suitable for use as the rail assembly 116 of FIG. 1. The rail assembly 316 is similar to the rail assembly 116, 216 (FIG. 7); therefore, like parts will be identified with like numerals increased to the 300 series with it being understood that the description of the rail assembly 116, 216 applies to the rail assembly 316 unless noted otherwise.

The rail assembly 316 includes a support frame 322, a connecting rail 318, and a mount 314. The support frame 322 includes a set of rails. The support frame 322 includes a perimeter rail 346 having a perimeter rail centerline 350. The support frame 322 includes a set of interior rails 360. The perimeter rail 346 extends between a first end 352, a second end 354, a third end 356, and a fourth end 358. The perimeter rail 346 can include a set of filleted corners 364. The connecting rail 318 terminates at a distal end 320 and includes a connecting rail centerline 362. The connecting rail 318 extends from the support frame 322 at a transition (e.g., the transition 144 of FIG. 2). The connecting rail 318 can be rotatable in a rotational direction (Rd) about the connecting rail centerline 362 to define a rotational axis (Rax). The mount 314 includes an interface 330. The interface 330 can be formed as any suitable interface such as, but not limited to, a hollow tube. The mount 314 can include a mounting platform 340. The connecting rail 318 is receivable within the mount 314. The rail assembly 316 includes a set of locks 328 and a set of lock receivers 338.

The rail assembly 316 is couplable (e.g., retrofittable) to a medical examination table 300. The medical examination table 300 includes a main body 302 with at least a side surface 304, a front surface 306, and a top surface 310. The rail assembly 316 is couplable to the side surface 304 of the main body 302.

The rail assembly 316 is similar to the rail assembly 116, 216 the connecting rail 318 is receivable within the mount 314. The mount 314, however, includes a singular interface 330 that extends outwardly from the side surface 304. The singular interface 330 is any suitable interface such as, but not limited to, a mounting tube 334. When received within the interface 330, the side surface 304 extends transverse the connecting rail centerline 362 of the connecting rail 318. Put another way, a projection of the connecting rail centerline 362 from the distal end 320 forms a non-zero angle with a plane extending along the side surface 104 when the connecting rail 318 is provided within the interface 330. The support frame 322 can be rotatable 360 degrees about the rotational axis (Rax).

The rail assembly 316 further includes a support frame 322 with a differing structure with respect to the support frame 122 of FIG. 1. Specifically, the perimeter rail centerline 350 follows a racetrack or oblong shape.

With respect to the rail assembly 116, 216, the rail assembly 316 has a simpler design. Specifically, the rail assembly 316 includes only a single interface 330. The rail assembly 316 does not sacrifice the positioning described in relation to the rail assembly 116, 216 as the rail assembly 316 can be rotatable 360 degrees about the rotational axis (Rax). As a non-limiting example, the illustrated positioning for the support frame 322 is in the first position (FIG. 1) and the third position (FIG. 5). Rotating the support frame 322 90 degrees clockwise from the illustrated position would result in a positioning of the support frame in the second position (FIG. 3). Rotating the support frame 322 180 degrees clockwise from the illustrated position would result in a positioning of the support frame in the fourth or stored position (FIG. 6).

Benefits associated with the present disclosure include a rail assembly that is retrofittable to existing or otherwise conventional medical examination tables. For example, conventional medical examination tables normally do not include rails to the patient utilize the conventional medical examination table. New conventional medical examination tables may include rails that are included during manufacture, however, buying a new conventional medical examination table is cost prohibitive. The rail assembly as described herein, however, is retrofittable to existing medical examination tables that do not have a rail system. The retrofittable nature of the rail assembly eliminates the need to buy a new medical examination table, thus greatly reducing the cost burden of upgrading a medical examination table.

To the extent not already described, the different features and structures of the various embodiments can be used in combination, or in substitution with each other as desired. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A rail assembly for a medical examination table, the medical examination table having a main body including a top surface and a side surface, the rail assembly comprising a support frame including a set of rails, a connecting rail extending from the set of rails to distal end, the connecting rail including a connecting rail centerline, and a mount retrofittable to the side surface of the medical examination table, connecting rail being receivable within a respective portion of the mount.

The rail assembly of any preceding clause, wherein the connecting rail is rotatable about a rotational axis corresponding to the connecting rail centerline at the distal end.

The rail assembly of any preceding clause, wherein the rail assembly is selectively coupled to the medical examination table in two or more positions defined by the set of rails being provided at varying circumferential positions with respect to the rotational axis.

The rail assembly of any preceding clause, wherein the rail assembly is selectively coupled to the medical examination table in two or more positions defined by the set of rails being provided at varying axial positions with respect to the rotational axis.

The rail assembly of any preceding clause, wherein the rail assembly is moveable with respect to the rotational axis between at least a position where the support frame defines a handle for and is accessible to a user of the medical examination table, and a stored position where the support frame is inaccessible to the user.

The rail assembly of any preceding clause, wherein the connecting rail is removably coupled to the mount.

The rail assembly of any preceding clause, wherein the mount comprises a mounting tube, at least a portion of the connecting rail being receivable within the mounting tube.

The rail assembly of any preceding clause, wherein a projection of the connecting rail centerline at the distal end forms a non-zero angle with a plane extending along either the top surface or a front surface of the main body is transverse.

The rail assembly of any preceding clause, wherein a projection of the connecting rail centerline at the distal end forms a non-zero angle with a plane extending along the side surface.

The rail assembly of any preceding clause, further comprising a lock and a lock receiver interfacing with the lock, the lock and the lock received configured to statically secure the connecting rail to the mount when the lock is engaged within the lock receiver.

The rail assembly of any preceding clause, wherein the lock is provided along the connecting rail and the lock received is provided along the mount.

The rail assembly of any preceding clause, wherein the lock is a push-pin and the lock receiver is a through-hole that the push-pin is selectively receivable within.

The rail assembly of any preceding clause, wherein the lock receiver comprises a plurality of lock receivers spaced about the mount, the plurality of lock receivers comprising a first lock receiver that statically secures the rail assembly in a first position when the lock is provided within the first lock receiver, and a second lock receiver that statically secures the rail assembly in a second position when the lock is provided within the second lock receiver, the first position defining a different positioning of the set of rails with respect to the second position.

The rail assembly of any preceding clause, wherein the lock comprises a plurality of locks spaced about the mount, the plurality of locks comprising a first lock that statically secures the rail assembly in a first position when the first lock is provided within the lock receiver, and a second lock that statically secures the rail assembly in a second position when the second lock is provided within the lock receiver, the first position defining a different positioning of the set of rails with respect to the second position.

The rail assembly of any preceding clause, wherein the mount comprises a first mount and a second mount, with the connecting rail centerline being non-parallel to the connecting rail centerline of the connecting rail when the connecting rail is received within the first mount than when received within the second mount.

The rail assembly of any preceding clause, wherein the distal end contacts the second mount when the connecting rail is received within the first mount.

The rail assembly of any preceding clause, wherein the support frame includes a perimeter rail defining a perimeter rail centerline extending transverse the connecting rail centerline.

The rail assembly of any preceding clause, wherein the medical examination table comprises opposing side surface, and the rail assembly is included within a set of moveable rail assemblies having a first rail assembly provided on a first side surface of the opposing side surfaces, and a second rail assembly provided on a second side surface of the opposing side surfaces.

The rail assembly of any preceding clause, wherein the rail assembly is retrofit to the medical examination table.

The rail assembly of any preceding clause, wherein the support frame includes a perimeter rail having a perimeter rail centerline, the perimeter rail extending between a first end and a second end.

The rail assembly of any preceding clause, where the first end is provided a maximum length from the second end, and a transition between the connecting rail and the support frame is provided at or less than 50% of the maximum length with 0% being at the first end.

The rail assembly of any preceding clause, wherein a transition of between the connecting rail and the support frame is located such that the connecting rail defines a respective portion of the first end.

The rail assembly of any preceding clause, wherein a transition between the rail and the support frame is provided along a respective portion of the perimeter rail.

What is claimed is:

1. A rail assembly for a medical examination table, the medical examination table having a main body including a top surface and a side surface, the rail assembly comprising:
- a support frame including a set of rails;
- a connecting rail extending from the set of rails to a distal end, the connecting rail including a connecting rail centerline;
- a mount coupled to the side surface of the medical examination table, connecting rail being receivable within a respective portion of the mount;
- a lock provided along the connecting rail; and
- a plurality of lock receivers spaced about the mount, the plurality of lock receivers comprising:
  - a first lock receiver that statically secures the rail assembly in a first position when the lock is provided within the first lock receiver; and a second lock receiver that statically secures the rail assembly in a second position when the lock is provided within the second lock receiver, the first position defining a different positioning of the set of rails with respect to the second position;

wherein the connecting rail in the first position is oriented in an active configuration;

wherein the connecting rail in the second position is oriented in an inactive configuration; and wherein the lock and the plurality of lock receivers are configured to statically secure the connecting rail to the mount when the lock is engaged within at least one lock receiver of the plurality of lock receivers.

2. The rail assembly of claim 1, wherein the connecting rail is rotatable about a rotational axis corresponding to the connecting rail centerline at the distal end.

3. The rail assembly of claim 2, wherein the rail assembly is selectively coupled to the medical examination table in two or more positions defined by the set of rails being provided at varying circumferential positions with respect to the rotational axis.

4. The rail assembly of claim 2, wherein the rail assembly is selectively coupled to the medical examination table in two or more positions defined by the set of rails being provided at varying axial positions with respect to the rotational axis.

5. The rail assembly of claim 2, wherein the rail assembly is moveable with respect to the rotational axis between at least:

a position where the support frame defines a handle for and is accessible to a user of the medical examination table; and a stored position where the support frame is inaccessible to the user.

6. The rail assembly of claim 1, wherein the connecting rail is removably coupled to the mount.

7. The rail assembly of claim 1, wherein the mount comprises a mounting tube, at least a portion of the connecting rail being receivable within the mounting tube.

8. The rail assembly of claim 1, wherein a projection of the connecting rail centerline at the distal end forms a non-zero angle with a plane extending along either the top surface or a front surface of the main body.

9. The rail assembly of claim 1, wherein a projection of the connecting rail centerline at the distal end forms a non-zero angle with a plane extending along the side surface.

10. The rail assembly of claim 1, wherein the support frame includes a perimeter rail defining a perimeter rail centerline extending transverse the connecting rail centerline.

11. The rail assembly of claim 1, wherein:

the medical examination table comprises opposing side surface; and the rail assembly is included within a set of moveable rail assemblies having a first rail assembly provided on a first side surface of the opposing side surfaces, and a second rail assembly provided on a second side surface of the opposing side surfaces.

12. The rail assembly of claim 1, wherein the rail assembly is retrofit to the medical examination table.

13. The rail assembly of claim 1, wherein the support frame includes a perimeter rail having a perimeter rail centerline, the perimeter rail extending between a first end and a second end.

14. A rail assembly for a medical examination table, the medical examination table having a main body including a top surface and a side surface, the rail assembly comprising:

a support frame including a set of rails;

a connecting rail extending from the set of rails to a distal end, the connecting rail including a connecting rail centerline;

a mount coupled to the side surface of the medical examination table, connecting rail being receivable within a respective portion of the mount;

a lock receiver provided along the mount; and a plurality of locks spaced about the connecting rail, the plurality of locks comprising:

a first lock that statically secures the rail assembly in a first position when the first lock is provided within the lock receiver; and a second lock that statically secures the rail assembly in a second position when the second lock is provided within the lock receiver, the first position defining a different orientation of the set of rails with respect to the second position;

wherein the plurality of locks and the lock receiver are configured to statically secure the connecting rail to the mount when at least one lock of the plurality of locks is engaged within the lock receiver.

15. The rail assembly of claim 14, wherein the lock receiver is included in a plurality of lock receivers.

16. A rail assembly for a medical examination table, the medical examination table having a main body including a top surface and a side surface, the rail assembly comprising:

a support frame including a set of rails;

a connecting rail extending from the set of rails to a distal end, the connecting rail including a connecting rail centerline; and a mount, the connecting rail being receivable within a respective portion of the mount, the mount comprising:

a first mount coupled to a first portion of the side surface; and a second mount coupled to a second portion of the side surface;

wherein the connecting rail centerline is in a first centerline position when the connecting rail is received within the first mount;

wherein the connecting rail centerline is in a second centerline position when the connecting rail is received within the second mount; and wherein the first centerline position is offset from the second centerline position.

17. The rail assembly of claim 16, further comprising a lock and a lock receiver interfacing with the lock, the lock and the lock receiver configured to statically secure the connecting rail to the mount when the lock is engaged within the lock receiver.

18. The rail assembly of claim 17, wherein the lock is provided along the connecting rail and the lock received is provided along the mount.

19. The rail assembly of claim 18, wherein the lock is a push-pin and the lock receiver is a through-hole that the push-pin is selectively receivable within.

20. The rail assembly of claim 16, wherein the distal end contacts the second mount when the connecting rail is received within the first mount.

* * * * *